Patented Apr. 10, 1951

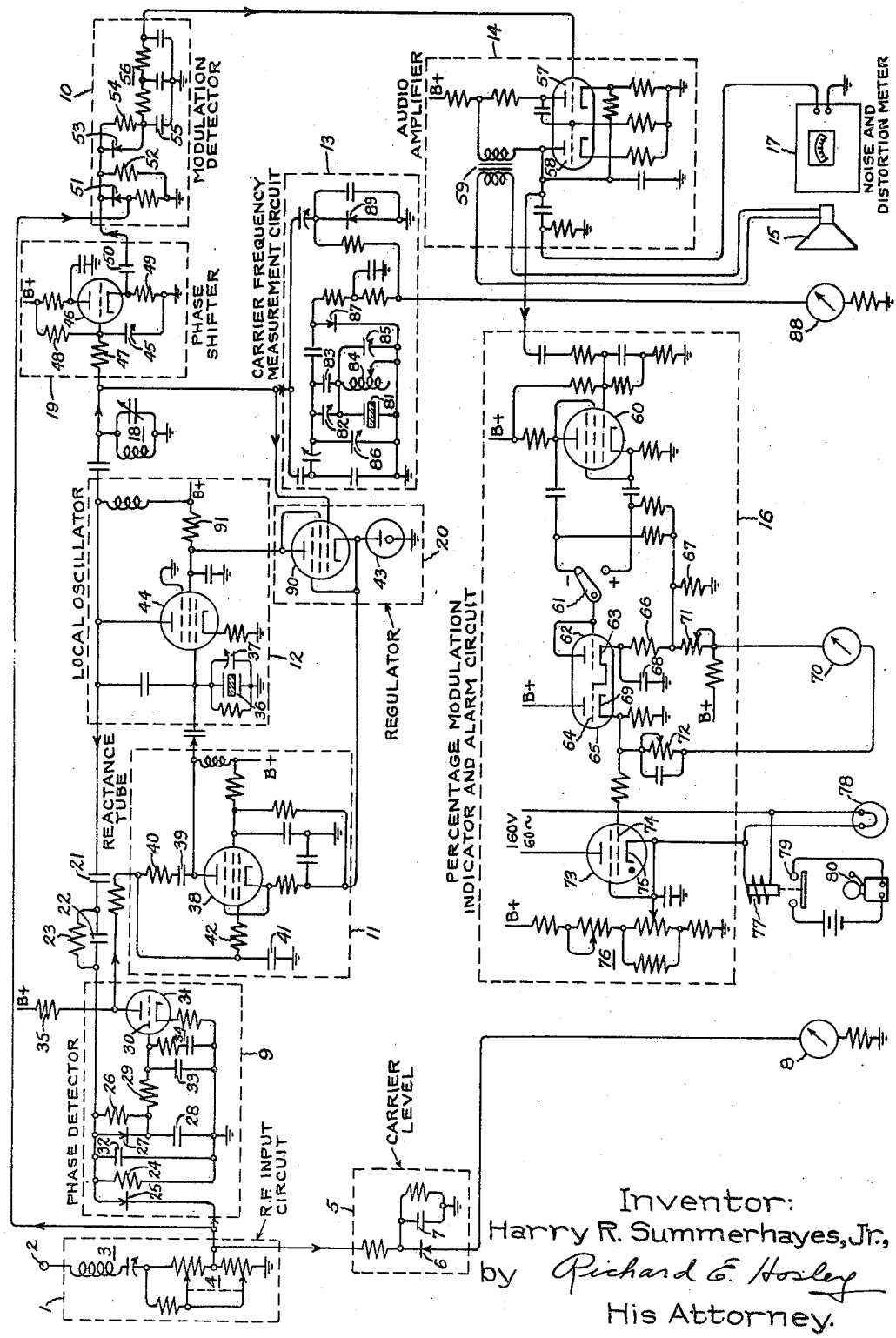

2,548,635

UNITED STATES PATENT OFFICE 2,548,635

MONITOR FOR AMPLITUDE MODULATED SIGNALS

Harry R. Summerhayes, Jr., Schenectady, N. Y., assignor to General Electric Company, a corporation of New York Application June 24, 1949, Serial No. 101,051

6 Claims. (Cl. 332—39)

My invention relates to signal monitors for indicating characteristics of a radio signal and more particularly to a monitor arranged to provide effective warning of drift outside of a predetermined range of the radio signal frequency.

A general object of my invention is to provide an improved monitor for radio frequency signals, and particularly amplitude modulated radio frequency signals.

A more specific object is to provide an off-frequency responsive means to operate an alarm in a radio frequency signal monitor.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing, of which the single figure is a circuit diagram of a monitor in accord with my invention.

The monitor shown in the drawing is provided with a radio frequency input circuit 1, having an input terminal 2 to which the signal to be monitored is furnished, and comprising a series tuned circuit 3 to prevent the passage of harmonic signal components and an attenuator 4. The signal from the input circuit is measured in intensity by a carrier level measuring circuit 5 comprising a rectifier 6 and storage capacitor 7 arranged with conventional load and current limiting resistors to provide a direct current to indicating meter 8 proportional to the mean radio frequency peak voltage. The attenuator is adjusted to provide a predetermined input signal operating level, that is a predetermined voltage on meter 8.

The modulated input signal is furnished through separate connections to a phase detector circuit 9 and a modulation detector circuit 10, each of which comprises subject matter described and claimed in United States Patent No. 2,427,688, issued September 23, 1947 and in application Serial No. 785,259, filed November 12, 1947, each being in the name of Donald E. Norgaard and assigned to the assignee of the present application.

Phase detector 9 operates in conjuction with a reactance tube circuit 11 to control a local oscillator 12 maintaining the frequency of the oscillator exactly equal to the carrier frequency of the input signal of the circuit 1 and maintaining the phase of the local oscillator signal substantially constant with respect to the input carrier.

The local oscillator signal, being unmodulated, is used in a carrier frequency measurement circuit 13 to provide an indication of small departures of the input frequency from the desired frequency. The carrier frequency measurement circuit 13 is of the type described and claimed in my copending application Serial No. 73,354, filed January 28, 1949, and assigned to the assignee of the present application.

The unmodulated signal from the local oscillator is also utilized together with the modulated input signal in modulation detector 10. As described hereinafter, the demodulation characteristics of the circuit 10 are such as to provide an audio output signal with very low distortion.

Demodulation products of the detector 10 are supplied to an audio amplifier 14 which energizes a monitoring loud speaker 15, provides a signal to a percentage modulation indicator and alarm circuit 16, and if desired, may be used to provide a signal to a noise and distortion meter 17.

The oscillator circuit 12 comprises a parallel tuned tank circuit 18 across which the oscillator output signal appears. This tank circuit tends to prevent spurious components from reaching detectors 9 and 10 and the carrier frequency measurement circuit 13, and serves as a stabilizing component of the oscillator circuit.

Arranged in series between the local oscillator and the modulation detector is a phase shift circuit 19 adjusted to provide substantially exact phase coincidence between the two signals supplied to the modulation detector. A regulator 20 is also provided which responds to the radio frequency voltage existing across tank circuit 18 and controls the oscillator 12 to limit the signal voltage thereof to a predetermined maximum amplitude.

The phase detector circuit 9, to which the local oscillator signal is provided through capacitor 21 and through capacitor 22 bypassed by resistor 23, and to which the modulated input signal is furnished from attenuator 4, furnishes a direct controlling voltage for reactance tube circuit 12. A direct voltage appears across resistor 24 from the rectification provided by a first rectifier or diode 25 proportional to the peak value of the vector sum of the two applied signals, since the modulated input signal is applied in series with the local oscillator signal and their sum appears across resistor 24. The voltage across resistor 24 is, accordingly, comprised of this direct voltage plus a radio frequency component comprising the local oscillator signal.

The voltage across resistor 26, in shunt to a second diode 27, is equal to the difference between the direct voltage component, across resistor 24, and the peak radio frequency component of the local oscillator signal, since the only radio frequency voltage applied to diode 27 is the local oscillator signal. The second diode 27 is connected as a peak detector and the direct voltage produced across resistor 26 is proportional to the peak voltage of the local oscillator signal. The direct voltage across resistor 26 subtracts from the direct voltage across resistor 24 to provide the output voltage.

The direct voltage output appearing across capacitor 28 is seen to be the difference voltage obtained by subtracting a direct voltage proportional to the peak voltage of the local oscillator from a direct voltage proportional to the peak value of the vector sum of the two applied radio-frequency signals.

In an operative embodiment of the invention, the peak value of the input signal was 8 volts, and the peak value of the local oscillator signal 20 volts, each as applied to the phase detector. Under these conditions the two signals must be displaced in phase by 78.6 degrees to provide zero output voltage across capacitor 28 and through filter resistor 29 to the control electrode 30 of direct current amplifier discharge device 31.

A capacitor 32 of small capacitance is provided in the phase detector circuit cooperating with capacitor 22 and resistor 23 and with other components to form an alternating voltage divider circuit to obtain a voltage of suitable amplitude for use in the phase detector, and capacitor 33 and resistance-capacitance network 34 are arranged to provide a filter for the detector output voltage. The time constant of the detector circuit, including this filter, the amplifier 31 and the reactance tube circuit 11, is short enough to lock the local oscillator into synchronism at its predetermined phase relationship to the input carrier signal during the brief period that the two signals are within a few degrees of the predetermined phase relationship, at which time the phase detector output voltage passes through zero. The time constant, on the other hand, must be long enough that the reactance tube does not lose control during the periods of zero radio frequency input signal intensity which exist when the signal is modulated 100 percent.

The reactance tube circuit receiving the signal from phase detector 9 through a connection to load resistor 35 of discharge device 31 acts as a small variable inductance shunting the piezoelectric crystal 36 effectively to reduce by varying amounts the capacitance across the crystal contributed by a small variable capacitor 37.

The oscillator operates at a frequency near the antiresonant frequency of the circuit comprising crystal 36, the various fixed elements in the control electrode circuit of the device 44 and the variable inductive reactance of the reactance tube circuit 11, and reactance tube circuit 11 is capable of modifying the frequency of the oscillator 12 within predetermined limits above and below the desired input frequency. In practice it has been found satisfactory to provide oscillator control by the reactance tube within limits of plus and minus 130 cycles above and below the desired carrier frequency of the input signal if the carrier frequency is approximately 1 megacycle.

The reactance tube circuit itself comprises an electron discharge device 38 arranged with a phase shifting feedback circuit from the anode element through capacitor 39 and resistor 40 to a capacitor 41 and through resistor 42 to the control electrode. The cathode potential of the discharge device 38 is supplied from a voltage regulator tube 43 in regulator circuit 20 whereby the control electrode of device 38 may be conductively connected through resistors to the anode circuit of device 31 without blocking capacitors, providing direct current coupling from direct current amplifier 31.

Local oscillator 12, which comprises a discharge device 44 and the crystal 36 is accordingly controlled to maintain oscillations having a predetermined phase displacement from the carrier component of the input signal. The output of the oscillator, to modulation detector 10, is shifted in phase by virtue of phase shift circuit 19 by an amount just sufficient to coincide substantially exactly with the phase of the carrier input signal, the necessary adjustments being conveniently made by a variable capacitor 45 arranged between the control electrode of device 46 and a ground terminal. This capacitor cooperates with resistor 47 in series with the incoming signal connection, and with a resistor 48 connected to the positive potential source, to shift the phase of the incoming signal. Resistors 47 and 48 cooperate to form a potential divider network, grounded through tank circuit 18, to maintain a positive bias on the control electrode of discharge device 46. The radio frequency signal, shifted in phase in accord with the adjustment to capacitor 45, and the values of resistors 47 and 48, appears across resistor 49 arranged in the cathode circuit of the discharge device, and the radio frequency alternating voltage existing on the cathode is supplied through coupling capacitor 50 to modulation detector 10.

The unmodulated radio frequency signal supplied through phase shifter 19 is greater in amplitude than the modulated input signal, preferably by about 15 times. The radio frequency voltages supplied to the detector are exactly in phase, within a very few degrees, and the detector operates as an exalted carrier detector in which negative peak clipping is substantially entirely absent. The reason for this is simply that a 100 percent modulated input signal is converted, prior to demodulation, into a signal having, for example, about 7 percent modulation if the input carrier is one-fifteenth the amplitude of the phase shifted local oscillator voltage as applied.

The modulation detector 10 comprises a circuit which will be seen to be substantially the same as that used in the phase detector 9. The modulated carrier and unmodulated radio frequency signal are applied in series to a first diode 51 which rectifies these signals providing a direct voltage component across resistor 52 proportional to the peak value of the vector sum of the two applied carrier voltages. This direct voltage will vary in accord with the modulation of the input signal, and the second diode 53 provides a voltage across resistor 54 proportional to the absolute value of the unmodulated local oscillator signal from capacitor 50, but the voltage applied to diode 53 is the large radio frequency signal of the local oscillator plus the varying direct voltage. The resultant voltage across capacitor 55 is the modulation voltage plus a small negative direct voltage component. It will be understood that this operation differs from that of phase detector 9 primarily in that the radio frequency signals applied in modulation detector 10 are substantially exactly in phase. Signals nearly in phase provide an output closely approximating the modulation components and little affected by slight departures, of a few degrees, from phase coincidence. Signals differing substantially in phase, as for example by 78.6 degrees, provide an output little affected by modulation but substantially changed by departures from the predetermined phase relationship. The output signal of the phase detector 9 is filtered sufficiently to vary little during one cycle of the modulating voltage of the lowest frequency probably to be present, as for example 50 cycles.

On the other hand, the demodulation products derived in detector 10 are filtered by filter 56 only to remove radio frequency components, capacitor 55 being a component of this filter. The audio signal thus derived is supplied to an audio amplifier 14 comprising two triode discharge devices 57 and 58 connected in cascade in a resistance capacity coupled circuit, in which degenerative feedback is preferably employed to insure undistorted amplification, and the output of the second triode device 58 is furnished through an output transformer 59 to the monitoring loud speaker 15, and through a direct connection to the percentage modulation indicator and alarm circuit 16. A connection may also be provided for a noise and distortion meter, as heretofore suggested, useful from time to time in testing the quality of the modulated input signal received on terminal 2 from the transmitter being monitored.

The percentage modulation and alarm circuit 16 comprises an electron discharge device 60 arranged in a phase splitting circuit to permit testing and determination of the percentage of modulation of either positive or negative modulation peaks. For this purpose a switch 61 is arranged to apply either the anode or cathode signal from the device 60, one of which represents positive and the other negative modulation peaks, to a rectifier 62 arranged to pass the signal representing the peaks of selected polarity from the phase splitter to the cathode 63 of the diode. Control electrode 64 of triode device 65 is directly connected to the cathode 63. The combination of resistors 66 and 67 and capacitor 68, connected to cathode 63, is arranged to respond rapidly to an increase in signal intensity but to have a long decay period. The cathode 69 of device 65 assumes the voltage of cathode 63 substantially exactly and with very little delay, and a fast acting meter circuit, comprising a meter 70, is arranged to indicate the voltage of the cathode 69. Since the decay time of the voltage is long, and the build-up time short, the meter is excited by a voltage corresponding to the maximum modulation excusions. It will be understood that the meter may be calibrated directly in percentage modulation and responds to negative or positive modulation in accord with the position of switch 61. Variable resistors 71 and 72 are arranged in the meter circuit to permit adjustments, respectively, to set the zero point of the meter and to adjust the sensitivity, whereby the other meter calibrations correspond accurately to the percentage modulation.

A grid controlled gaseous discharge device 73 is arranged for triggering in response to even very brief sharp overmodulation pulses. As the cathode 69 of device 65 and control electrode 74 of device 73 reach a predetermined positive potential greater than the positive potential applied to cathode 75 of device 73 through the potential divider network 76, the device 73 is conditioned for firing. Device 73 is connected to a 60 cycle alternating current source and will fire whenever a positive half cycle of anode voltage occurs with a sufficiently positive control electrode voltage. A relay operating coil 77 and small lamp 78 are connected in parallel in the series anode-cathode circuit of device 73 to be excited by the firing thereof. Lamp 78 flashes and the relay picks-up to close contacts 79 and operate alarm bell 80 whenever the modulation peaks exceed the maximum determined by the cathode bias of device 73. This bias may be normally set by divider 76 to provide alarm indications of greater than 100 percent modulation or readily adjusted to indicate any other percentage as desired.

The system described, including the overmodulation alarm and synchronized local oscillator, has many operating advantages. The local oscillator signal, being unmodulated, is much more readily measured as to frequency than a modulated signal. It is also desirable, as described, to utilize the unmodulated local oscillator signal in an exalted carrier detector having an output which is substantially linear and which contains substantially no components arising from peak clipping or diode non-linearity. As heretofore stated, the reactance tube is capable of controlling the local oscillator through a limited range of frequency, such as about 250 cycles. If the carrier frequency of the input signals drifts out of this range, the reactance tube looses control of the oscillator and the local oscillator frequency drifts away from the input signal carrier frequency being separated therefrom by what will usually be a low audio frequency. When this oscillator frequency, somewhat removed from the carrier frequency of the input signal, is supplied to the modulation detector 10, a strong beat note is produced in the detector output together with a badly distorted reproduction of the original modulation as the two radio frequency signals go in and out of phase. The detector output, accordingly, provides a very disagreeable, loud, immediately recognizable noise from loud speaker 15, audibly warning that the carrier frequency is no longer correct. At the same time, large signal components are furnished to the percentage modulation indicator and alarm circuit 16, both positive and negative in polarity, and the percentage modulation indicator meter 70 is driven off scale beyond the 100% position and gaseous discharge device 73 conducts to cause alarm 80 and flasher lamp 78 to operate. The result is that off-frequency transmitter operation provides a loud disagreeable loudspeaker warning, an alarm bell warning, an alarm flashing lamp warning, and an off-scale warning on meter 70.

The carrier frequency measurement circuit 13 operates as a frequency discriminator and comprises a piezoelectric crystal element 81 arranged with a series capacitance formed of two elements 82, 83, one of which is adjustable, and a shunt inductance element 84. The inductance element 84 may be adjustable as shown, or may have a variable capacitor 85 connected in parallel thereto to permit adjustments to the net effective inductance, or both may be provided to permit coarse adjustments by means of the one and fine adjustments by the other. The crystal 81 and capacitors 82, 83 form a series resonant circuit at a frequency slightly above the natural resonant frequency of the crystal alone, and at this frequency a minimum impedance is presented. At a frequency somewhat further above the natural resonant crystal frequency, the net impedance of the circuit comprising capacitors 82, 83 and crystal 81 becomes inductive and will form with a capacitor 86 a parallel resonant circuit presenting maximum impedance.

The crystal element 81 is preferably stable and temperature controlled, and comprises the main frequency standard of the monitor. A diode detector 87 is arranged, with suitable load resistors and capacitors, to detect the voltage appearing across the crystal circuit furnished from the local oscillator 12. This voltage will be a maximum if the frequency of the local oscillator falls at the parallel resonant frequency for the crystal circuit and will be a minimum if the frequency corresponds to the series resonant frequency. In practice, the series and parallel frequencies are arranged to be approximately equidistant from the desired mean operating frequency of the monitored transmitter, and the purpose of the net effective inductance element 84 as adjustably reduced by capacitor 85 is to nullify all of the equivalent shunt capacitance of the crystal, crystal holder and stray capacitances. This arrangement permits the frequency separation between the series and parallel resonant points to remain substantially unchanged when both of these points are shifted together by adjustments to series capacitor 82, such adjustments of capacitor 82 being made to so adjust the crystal circuit that the desired operating transmitter frequency falls substantially exactly midway between the series and parallel resonant frequencies of the crystal circuit.

The detected voltage is indicated by a meter 88 which is preferably calibrated to read directly cycles of displacement of the local oscillator signal, and thus of the input signal on terminal 2, from the desired operating frequency. Operation exactly on this frequency provides a detected voltage of predetermined magnitude, corresponding to a zero meter scale position, and departures from the desired frequency increase or decrease the voltage in accord with the direction of displacement of the local oscillator signal from the desired frequency.

Slight changes which may occur in the magnitude of the local oscillator signal are compensated by a diode 89 arranged to rectify this signal directly and apply a biasing potential proportional thereto to the detector circuit comprising diode 87. This compensation is exactly correct for null indications, but only partially effective for departures from the desired frequency. Thus small signal intensity variations provide slightly erroneous meter indications of cycles displacement from the desired center frequency, which error disappears at zero displacement.

As heretofore pointed out, large changes in oscillator signal intensity are prevented by the regulator circuit 20 since discharge device 90 is arranged to draw current through resistor 91, when the peak voltage across tank circuit 18 exceeds the potential of voltage regulator tube 43, to drop the screen electrode potential of oscillator device 44. The amplitude of the oscillator voltage is thus limited to a predetermined maximum amplitude. The oscillator normally tends to produce an amplitude greater than this maximum amplitude, and the amplitude is thus maintained substantially constant.

While I have shown only certain preferred embodiments of my invention by way of illustration, many modifications will occur to those skilled in the art and I therefore wish to have it understood that I intend, in the appended claims, to cover all such modifications as fall within the true spirit and scope of my invention.

What I claim as new and desire to secure by Letters Patent of the United States is:

1. In a signal monitor for monitoring an input signal, a local oscillator comprising a frequency determining element, a variable electronic reactance connected in circuit with said element operative to control the frequency of oscillations of said oscillator through a limited frequency range, said input signal being subject to frequency excursions within and without said range, means responsive to the phase differential between said input signal and a voltage produced in said oscillator to vary said reactance and synchronize said oscillator voltage in predetermined phase relation with said input signal when the frequency of said input signal is within said range, second phase responsive means connected to receive said voltage and said input signal to provide an output voltage corresponding to a beat frequency between the frequency of said oscillator voltage and the frequency of said input signal when said signal is outside said range, and means to indicate said beat frequency output voltage.

2. In a signal monitor for monitoring a modulated input signal, a local oscillator comprising a frequency determining element, a variable electronic reactance connected in circuit with said element operative to control the frequency of oscillations of said oscillator through a limited frequency range, said input signal being subject to frequency excursions within and without said range, means responsive to the phase differential between said input signal and a voltage produced in said oscillator to vary said reactance and synchronize said oscillator voltage in predetermined phase relation with said input signal when the frequency of said input signal is within said range, second phase responsive means connected to receive said voltage and said input signal to provide an output voltage corresponding to a beat frequency between the frequency of said oscillator voltage and the frequency of said input signal when said signal is outside said range, and means to indicate said beat frequency output voltage, said second phase responsive means comprising demodulating means for said input signal.

3. In a signal monitor for monitoring a modulated input signal, a local oscillator comprising a frequency determining element, a variable electronic reactance connected in circuit with said element operative to control the frequency of oscillations of said oscillator through a limited frequency range, said input signal being subject to frequency excursions within and without said range, means responsive to the phase differential between said input signal and a voltage produced in said oscillator to vary said reactance and synchronize said oscillator voltage in predetermined phase relation with said input signal when the frequency of said input signal is within said range, second phase responsive means connected to receive said voltage and said input signal to provide an output voltage corresponding to a beat frequency between the frequency of said oscillator voltage and the frequency of said input signal when said signal is outside said range, and means to indicate said beat frequency output voltage, said second phase responsive means comprising demodulating means for said input signal, and said indicating means comprising means to indicate a modulation characteristic of said input signal.

4. A signal monitor comprising an oscillator having a frequency determining element, an electronic reactance device connected to said oscillator to control the frequency thereof over a limited frequency range only, a phase detector connected to receive the input signal to be monitored and the signal generated by said oscillator to provide a voltage related to the phase difference in said signals, said input signal being normally of a frequency within said limited range but subject to excursion out of said range, means to supply said voltage to said reactance device thereby to control said oscillator in frequency and phase to predetermined relation with the frequency and phase of said input signal, a modulation detector comprising means to compare said input signal and said oscillator signal in phase, and means connected to said detector to provide an audible reproduction of the detected amplitude modulation of said input signal, whereby said audible reproduction is distorted when said input signal frequency drifts out of said limited range.

5. A monitor for an input signal, said signal comprising a radio frequency component, said monitor comprising local oscillator means, means to synchronize said oscillator means with said component in frequency and phase normally to provide an unmodulated signal from said oscillator means in phase with said component, said synchronizing means being effective only over a predetermined limited range of frequencies, an exalted carrier detector circuit connected to receive said input signal and said unmodulated signal, and means responsive to the output of said detector circuit to indicate departures from normal of said output when said component and local signal differ in frequency.

6. A monitor for an input signal, said signal comprising a carrier component and a modulation component, said monitor comprising local oscillator means, means responsive to the voltage of said local oscillator means and to said carrier component to control said oscillator to maintain said voltage in predetermined phase and frequency relation to said carrier component, said last means being effective to control said oscillator means over a limited frequency range only, said carrier component being normally within said range but subject to excursions out of said range, phase responsive means to receive and compare the relative phase of said voltage and said component and to provide an output voltage having a predetermined relation to the phase displacement between said voltage and component thereby to provide an output voltage varying in accord with the beat frequency between said carrier component and said voltage of said oscillator means during said excursions of said carrier component, said phase responsive means comprising an exalted carrier demodulator for said modulation component, and means connected to receive the output voltage of said phase responsive means normally to indicate characteristics of said modulation component and to indicate the presence of said beat frequency output voltage during said excursions.

HARRY R. SUMMERHAYES, Jr.

REFERENCES CITED

The following references are of record in the file of this patent:

UNITED STATES PATENTS

| Number | Name | Date |
|---|---|---|
| 2,309,481 | Summerhayes | Jan. 26, 1943 |
| 2,324,914 | Dow | July 20, 1943 |
| 2,419,527 | Bartelink | Apr. 29, 1947 |